United States Patent Office 3,380,943
Patented Apr. 30, 1968

3,380,943
PROCESS FOR PRODUCING STABLE AQUEOUS EMULSIONS OF COMPOUNDS CONTAINING PERFLUORALKYL GROUPS AND EMULSIONS PRODUCED
Heinz Enders, Stadtbergen, near Augsburg, Hans Deiner, Augsburg, Willy Bernheim, Goggingen, near Augsburg, and Franz Mosch and Theodor Stenzinger, Augsburg, Germany, assignors to Chemische Fabrik Pfersee G.m.b.H., Augsburg, Germany, a firm of Germany
No Drawing. Filed Mar. 30, 1965, Ser. No. 444,065
17 Claims. (Cl. 260—29.2)

ABSTRACT OF THE DISCLOSURE

Aqueous emulsions of the reaction product of (1) a polyisocyanate, (2) a perfluoralkylsulfonamide and (3) a compound having the formula RX, wherein R is an aliphatic hydrocarbon residue with more than 12 carbon atoms and X is a hydroxyl, carboxyl, carboxylic acid amide or amino group.

---

This invention pertains to processes for producing stable aqueous emulsions of compounds containing perfluoralkyl-groups.

The compounds containing perfluoralkyl-groups are organo-soluble reaction products from (a) one mol of an aromatic, alicyclic or aliphatic polyisocyanate with at least two isocyanate groups; (b) about 0.3–0.6 mol per isocyanate group of a compound having the formula

$$R_fSO_2NR_1R_2 \quad (I)$$

wherein $R_f$ is a perfluoralkyl residue with at least 4 carbon atoms; $R_1$ is hydrogen or an aliphatic residue with at most 6 carbon atoms; and $R_2$ is hydrogen or an $\beta$-oxyalkyl residue with 2–5 carbon atoms; and (c) about 0.1 to 0.5 mol per isocyanate group of a compound having the formula

$$R_3X \quad (II)$$

wherein $R_3$ is a possibly branched aliphatic hydrocarbon residue with more than 12 carbon atoms and X is a hydroxyl, carboxyl, carboxylic acid amide or amino group.

An object of the present invention is to improve the manufacture of emulsions of this type.

Other objects will become apparent in the course of the following specification.

The present invention is based in part on the discovery that special advantages result when these compounds are transformed into aqueous emulsions by emulsifying them in the form of their solutions in organic solvents with aqueous solutions or dispersions of neutralized or acidified reaction products of aliphatic or aromatic compounds containing epoxy-groups with di- or polyamines of the aliphatic, cycloaliphatic or heterocyclic series.

Condensation products of the epoxy-amine reaction products with low aldehydes, particularly formaldehyde, were often found to be particularly advantageous for emulsification purposes in relation to these reaction products of compounds containing epoxy-groups and polyamines.

According to another feature of the present invention the emulsification of said solutions in organic solvents is carried out with aqueous solutions of polyvinyl alcohol which may be also partly acylated or acetalated.

Emulsions produced in accordance with the present invention have many important advantages in comparison with emulsions made with other emulsifiers. Namely, emulsions of the present invention are very stable with reference to mechanical stresses, such as shaking, even if the emulsion is in a diluted form. Further advantages consist in its insensitiveness against addition of other substances, such as other textile treating means. This property is of particular importance when the emulsions are used to make textiles oil and water repellent, since the usual treating baths contain additionally synthetic resins, softeners, etc. Furthermore, the emulsions of the present invention are very stable in storage and do not have any precipitations even after being stored for a long time.

The aforesaid epoxy-amine reaction products are produced by heating aliphatic or aromatic glycide ethers with aliphatic, cycloaliphatic or heterocyclic di- or polyamines, preferably in the presence of an organic solvent mixable with water to temperatures of about 40° C. up to the boiling point of the solvent until the solution is clear or is only slightly turbid. Then it is neutralized or set to an acid pH-value of about 5–6 by acids volatisable in heat, such as low aliphatic carboxylic acids, but also muriatic acid. Similar products can be produced by heating glycide ether with salts of the polyamine with the volatile acid, whereby after reaction the pH-value is set to neutral or acid by a further addition of the volatile acid.

Thereafter these products can be further condensated in an acid state by heating after the addition of low aliphatic aldehydes, particularly formaldehyde or glyoxal, whereby care must be taken that no hardening should take place with precipitation of insoluble large particles. However, turbid solutions, before or after treatment with aldehyde, are still suitable for emulsification, so long as they constitute fine-particled dispersions which are still stable in concentrated as well as diluted state.

As examples of aliphatic or aromatic glycide ethers can be indicated those of polyvalent aliphatic alcohols, such as ethylene-, propylene-, and butylene- diol, glycerol, 1,2,3-butanetriol or those of polyvalent phenols, such hydroquinone, resorcinol, 1,6-naphthalenediol, 4,4'-dihydroxydiphenylmethane or 4,4'-dihydroxydiphenylpropane.

As example of di- or polyamines can be indicated alkylene diamines, such as ethylene-, propylene-, butyleen- or N-ethyl-propylene diamine, polyalkylene polyamines, such as diethylene triamine, triethylene tetramine, dipropylene triamine or ($\omega,\omega'$-diethyl)diethylene triamine, cycloaliphatic diamines, such as 1,4-diaminocyclohexane, heterocyclic compounds with at least 2 secondary amino groups, such as piperazine, and, finally, ethylenimine.

The relative amounts of glycide ethers and polyamines can vary within wide limits. 3 epoxy groups of glycide ether can be used for each hydrogen atom of polyamine capable of reaction, or, reversely, the number of hydrogen atoms of the polyamine can be equal to or larger than the number of epoxy groups. It is possible to go up to 10 amine-hydrogen atoms per each epoxy group, while particularly suitable are reaction products with 1.5–4 amine-hydrogen atoms per each epoxy group.

Among the low aliphatic aldehydes particularly suitable are formaldehyde and glyoxal, but croton- or acetaldehyde can be also used. They amount to 10–100%, particularly 30–50% of the weight of the condensation product of reaction products containing epoxy groups and polyamines. The condensation with the aldehydes is usually carried out at temperatures ranging between 60° C.– 80° C. for one hour.

The amount of epoxy-amine-reaction products respectively of condensation products to be used for the production of the emulsions in accordance with the present invention is 0.5% to 10% in relation to the total weight of the concentrated aqueous emulsion, particularly 1% to 4%. These percentages refer to the weight of the reaction product of epoxy-compound and polyamine, irrespective as to whether this reaction product was further reacted with an aldehyde.

In producing emulsified compounds with solutions of polyvinyl alcohol it was found advisable to use polyvinyl alcohol having an average molecular weight of substantially 50,000 to 150,000, particularly 80,000 to 120,000 and having in a 4% aqueous solution at 20° C. viscosities of 20–60, preferably 25–30 cp. The degree of esterification indicated as saponification number can amount to 150. Partly acetalized polyvinyl alcohols can be also used in the same manner, whereby, however, the degree of acetalization must not exceed 50%. As aldehydes for the acetalization can be used aliphatic aldehydes with 1 to 4 C-atoms, particularly formaldehyde. However, the polyvinyl alcohol should be acetylized or acetalized only to such an extent that it is still completely soluble in water.

The amount of polyvinyl alcohol used for the making of emulsions in accordance with the present invention amounts to 0.5% to 10% relatively to the total weight of the concentrated aqueous emulsion, particularly 1% to 4%. These percentages refer to the weight of the 100% polyvinyl alcohol.

The following can be used as initial substances for the individual components in the manufacture of the compounds to be emulsified and containing perfluoralkyl groups:

Polyisocyanates, particularly the aromatic ones, such as tolulylene diisocyanate, diphenylmethane-p, p'-diisocyanate, triphenyl methane-p, p', p''-triisocyanate, etc. However, aliphatic and alicyclic isocyanates, such as hexamethylene diisocyanate, methylcyclohexenyl-diisocyanate, etc., can be also used. Preferably, di- and/or triisocyanates are used.

The initial substances of the aforesaid Formula I are preferably such wherein the perfluoralkyl residue has 6 to 12 C-atoms. These initial substances are produced in accordance with processes known per se. The best results are produced when such initial substances of Formula I are used wherein $R_1$ is a low aliphatic residue, such as methyl or ethyl, and $R_2$ is a low hydroxyalkyl residue, such as hydroxyethyl.

As initial substances of the aforesaid Formula II can be used all aliphatic alcohols containing more than 12 C-atoms, amines, carboxylic acids or carboxylic acid amides. Preferably, initial substances are used with an aliphatic residue of 16 to 22 C-atoms. The best results are attained with the use of saturated, straight-chain, aliphatic alcohols with 16 to 18 C-atoms.

The reaction of the 3 components to produce the compounds of the present invention is carried out in accordance with the above-mentioned earlier patent application. The 3 components are jointly heated to temperatures above 80° C., preferably 120°–160° C. The duration of the heating is from 30 to 120 minutes, but it can be longer or shorter. The reaction can be carried out in the presence of an inert high boiling solvent, such as aromatic hydrocarbons, halogenated aromatic hydrocarbons or cyclic sulfones, such as tetramethylene sulfone.

It is also possible to carry out the reaction in steps, for example, by firstly heating polyisocyanate with an initial substance of Formula I, and thereupon with an initial substance of Formula II, or vice versa.

As organic solvents for producing solutions of compounds containing perfluoralkyl groups can be particularly used mixtures of low, water soluble ketones with aliphatic chlorinated hydrocarbons, such as trichlorethylene or perchlorethylene, or aromatic hydrocarbons, such as benzene toluene, etc.

The amount of compounds containing the perfluoroalkyl groups to be emulsified is 5% to 20% in relation to the total weight of the aqueous concentrated emulsion, preferably 8% to 15%. Obviously emulsions can be also produced with smaller amounts of compounds containing perfluoroalkyl groups. However, they then have the drawback that they can not be diluted any more with water to any substantial extent for technical use. Furthermore, then the ratio of the emulsifying means to the emulsified substance is unsatisfactory, i.e. a comparatively great deal of emulsifying means is required. This again makes worse the applicational uses, i.e. oil repelling properties produced with such emulsions are only very small.

The following examples are given by way of illustration only:

*Product A.*—50 gr. (0.1 mol) of perfluoroctane-sulfonic acid amide are heated with 17.4 gr. (0.1 mol) toluylene diisocyanate in 250 ml. xylenehexafluoride for 1 hour with extensive reflux. Then the product is cooled, 7 gr. (0.026 mol) octadecyl alcohol are added thereto and it is again heated for 1½ hours with reflux. After the reaction is completed the solvent is removed in vacuum. The oily brown residue solidifies in a desiccator into a glass-like mass. If xylenehexafluoride is not completely removed, a dilution with perchlorethylene is easily possible.

*Product B.*—50 gr. (0.1 mol) of perfluoroctane sulfonic acid amide are boiled with 36.7 gr. (0.1 mol) triphenyl methane-4,4',4''-triisocyanate and 28.6 gr. (0.1 mol) stearic acid for 1 hour in 250 ml. ω-dichlorbenzene with reflux. After the removal of the solvent a violent glass-like product remains.

*Product C.*—57 gr. (0.1 mol) N-ethyl-N-β-hydroxyethyl-perfluoroctane sulfonic acid amide and 36.7 gr. (0.1 mol) triphenylmethane-4,4',4''-triisocyanate are heated without a solvent for ½ hours to 140°–150° C. 27 gr. (0.1 mol) octadecanol are introduced into the melt and it is heated again for ½ hour to 140°–150° C. After cooling the product solidifies as a violet glass-like mass.

*Product D.*—57 gr. (0.1 mol) N-ethyl-N-β-hydroxyethyl-perfluoroctane sulfonic acid amide and 40 gr. (0.084 mol) thiophosphoric acid-tris- (4-isocyanatophenyl)-ester are heated with 27 gr. (0.1 mol) octadecanol without solvents for ½ hour to 130°–140° C. The result is a yellow-brown brittle product.

*Product E.*—36.7 (0.1 mol) triphenylmethane-4,4', 4''-triisocyanate and 28.5 gr. (0.1 mol) stearic acid are heated for 30 minutes to 190°–200° C., then they are somewhat cooled and after addition of 52.7 gr. (0.1 mol) N-ethyl-perfluoroctane sulfonic acid amide are heated for further 20 minutes to the same temperature. The resulting product is brown-violet and hard.

*Product F.*—86 gr. (0.15 mol) N-ethyl-N-β-hydroxyethyl-perfluoroctane sulfonic acid amide, 36.7 gr. (0.1 mol) triphenylmethane-4,4',4''-triisocyanate and 13.5 gr. (0.05 mol) octadecylamine are refluxed for 1 hour in 250 ml. xylenehexafluoride.

The solvent is removed in vacuum and a violet brittle product is obtained.

*Product G.*—58.5 gr. (0.1 mol) N-n-propyl-N-β-hydroxyethyl-perfluoroctane sulfonic acid amide, 25 gr. (0.1 mol) diphenylmethane p,p'-diisocyanate and 7 gr. (0.025 mol) octadecanol are heated without solvents for ½ hour to 160°–170° C.

MANUFACTURE OF EPOXY-AMINE REACTION PRODUCTS

*Product H.*— 100 gr. of a glycide ether from p,p'-dioxydiphenyl-2,2-propane-(20.43% epoxy groups) are dissolved in 160 ml. methanol, are then treated with 20 gr. ethylene diamine (85%) and are heated for 40 minutes to 40° C.–50° C. in a bottle equipped with a reflux condenser. The resulting reaction product is adjusted to a pH-value of 5 with aqueous 10% acetic acid and is diluted with water to 1200 gr.

*Product I.*—100 gr. of the glycide ether used for product H are diluted with 160 gr. methanol and after the addition of 50 gr. diethylene triamine are heated for 40 minutes to about 50° C. Thereupon 250 gr. of an aqueous 8.5% acetic acid solution are added and then the mixture is heated for further 25 minutes to 65° C. Then the reaction is interrupted by cooling and the addition of 450 gr. of the same aqueous 8.5% acetic acid solution.

*Product K.*—100 gr. of the reaction product H are treated with 50 gr. of an aqueous 37% formaldehyde solution and are heated for one hour in a reflux condenser to 60°–70° C.

Product L.—176 gr. of a glycide ether of ethylene glycol containing 0.57 mol epoxy groups per 100 gr., are diluted with 200 ml. methanol and after the addition of 62 gr. diethylene triamine are heated for 6 minutes to 60° C. in a bottle equipped with a reflux condenser and thereupon are adjusted to a pH-value of 6 with aqueous 10% acetic acid.

Product M.—40 gr. of glycide ether referred to in product H are diluted with 24 ml. methanol and after the addition of 5 gr. diethylene triamine are heated for 10 minutes to 45° C. Then 4 ml. glacial acetic acid are added and the temperature is maintained at 45° C. for further 10 minutes. After cooling 8 ml. glacial acetic acid are added and the product is diluted to 400 gr.

The following are examples of emulsions produced by emulsification with reaction products of glycidyl ethers with amines.

Example 1

333 gr. of a solution contining 100 gr. of product C, 70 gr. acetone and 163 gr. perchlorethylene are preemulsified with 200 gr. product H in a high speed stirrer and after the addition of 445 gr. water and 20 gr. of aqueous 60% acetic acid are treated in a high pressure homogenizing machine. The result is a white, very finely particled and storage-stable emulsion. Even after being stored for 6 months this emulsion has shown no separation of the dispersed phase.

Example 2

500 gr. of a solution containing 125 gr. product D, 125 gr. methylethylketone and 250 gr. perchlorethylene are preemulsified with 120 gr. product I and after the addition of 380 gr. water are homogenized under high pressure. The properties of the emulsion correspond largely to those of the emulsion produced in accordance with Example 1.

Example 3

100 gr. of product F are dissolved in 100 gr. methylethylketone and diluted with 300 gr. perchlorethylene. This solution is preemulsified with a high speed stirrer along with a solution consisting of 250 gr. product K, 250 gr. water and 10 gr. of aqueous 85% formic acid and is then finally emulsified in a high pressure homogenizing machine.

Example 4

A similar emulsion is produced when 100 gr. product E are dissolved as in the preceding example with 100 gr. methylethylketone and 300 gr. perchlorethylene, and are then emulsified with a solution consisting of 320 gr. product L, 180 gr. water and 7 gr. of aqueous 60% acetic acid in a manner corresponding to the above-described process.

Example 5

400 gr. of a solution consisting of 100 gr. product G, 100 gr. methylethylketone and 300 gr. perchlorethylene are presmulsified with 200 gr. product H; then after the addition of further 400 gr. water the emulsion is completed in a high pressure homogenizing machine.

Example 6

A mixture of 40 gr. product C and 50 gr. product B after being dissolved in 100 gr. methylethylketone, is diluted with 260 gr. perchlorethylene and is emulsified in the above-described manner with a solution consisting of 100 gr. product M, 475 gr. water and 12 gr. glacial acetic acid.

Example 7

320 gr. of a solution consisting of 70 gr. product A, 75 gr. methylethylketone and 175 gr. toluol are preemulsified with 80 gr. product H, after the addition of 595 gr. water and 5 gr. aqueous 85% formic acid, is finally emulsified in a high pressure homogenizing machine.

Example 8

60 gr. of product B are dissolved in 70 gr. methylisobutylketone and are diluted with 150 gr. trichlorethylene. This solution along with a mixture of 200 gr. product K and 125 gr. water is emulsified in a high pressure homogenizing machine.

The following are examples of emulsions produced with solutions of polyvinyl alcohol:

Example 1a 333 gr. of a solution containing 100 gr. product C, 70 gr. acetone and 163 gr. perchlorethylene, are preemulsified in a high speed stirrer with 200 gr. of a 10% solution of polyvinyl alcohol (viscosity of a 4% solution 28 cp., saponification number 140) and after the addition of 445 gr. water and 20 gr. of aqueous 60% acetic acid are treated in a high pressure homogenizing machine. The result is a white, very fine particled and storage-stable emulsion. This emulsion has shown no separation of the emulsified phase even after having been in storage for 6 months.

Example 2a 500 gr. of a solution containing 125 gr. product D, 125 gr. methylethylketone and 250 gr. perchlorethylene are preemulsified with 120 gr. of a 15% polyvinyl alcohol solution (viscosity of a 4% solution 40 cp., saponification number 30) and after the addition of 380 gr. water are homogenized under high pressure. The properties of the emulsion correspond to a great extent to those produced in accordance with Example 1a.

Example 3a 100 gr. of product F are dissolved in 100 gr. methylethylketone and diluted with 300 gr. perchlorethylene. This solution along with 250 gr. of a 10% solution of polyvinyl alcohol (viscosity of a 4% solution 30 cp., saponification number 140), 250 gr. water and 10 gr. of aqueous 85% formic acid, is preemulsified with a high speed stirrer and then emulsification is completed in a high pressure homogenizing machine.

Example 4a

A similar emulsion is produced when 100 gr. of product B are dissolved corresponding to the preceding example with 100 gr. methylethylketone and 300 gr. perchlorethylene, and are then emulsified in accordance with the above described process with 320 gr. of an 8% solution of polyvinyl alcohol (viscosity of a 4% solution of 60 cp., saponification number 50), 180 gr. water and 7 gr. aqueous 60% acetic acid.

Example 5a 400 gr. of a solution consisting of 100 gr. product G, 100 gr. methylethylketone and 300 gr. perchlorethylene are preemulsified with 200 gr. of a 10% solution of a partly acetalized polyvinyl alcohol (viscosity in a 4% solution 30 cp., saponification number 30, 4% of bound acetaldehyde) and then after the addition of further 400 gr. water the emulsion is completed in a high pressure homogenizing machine.

Example 6a

A mixture of 40 gr. product C and 50 gr. product B after being dissolved in 100 gr. methylethylketone, is diluted with 260 gr. perchlorethylene and is emulsified in the above described manner with a solution containing 100 gr. of a 25% solution of polyvinyl alcohol (viscosity in a 4% solution 20 cp., saponification number 40), 485 gr. water and 12 gr. glacial acetic acid.

Example 7a 320 gr. of a solution containing 70 gr. of product A, 75 gr. methylethylketone and 175 gr. toluol are preemulsified with 180 gr. of a 20% solution of polyvinyl alcohol (viscosity in a 4% solution 25 cp., saponification number 140) and after the addition of 495 gr. water and 5 gr. aqueous 85% formic acid are finally emulsified in a high pressure homogenizing machine.

Example 8a 60 gr. of product B are dissolved in 70 gr. methylisobutylketone and diluted with 150 gr. trichlorethylene. This solution is emulsified in a high pressure homogenizing machine along with a mixture consisting of 200 gr. of a 10% polyvinvyl alcohol (viscosity 30 cp., saponification number 140) and 125 gr. water.

It is apparent that the above examples have been given solely by way of illustration and not by way of limitation and that they are capable of many variations and modifications within the scope of the present invention. All such modifications and variations are to be included within the scope of the present invention.

What is claimed is:

1. The process of producing aqueous emulsions of compounds containing perfluoralkyl groups, which comprises emulsifying in water organic solutions of reaction products of
    (a) one mol of a polyisocyanate selected from the class consisting of aromatic, alicylic and aliphatic polyisocyanates with at least two isocyanate groups,
    (b) substantially from 0.3 to 0.6 mol per isocyanate group of a compound having the formula $$R_fSO_2NR_1R_2$$

wherein $R_f$ is a perfluoralkyl residue with at least four carbon atoms; $R_1$ is a residue selected from the class consisting of hydrogen and an aliphatic residue with at most 6 carbon atoms; and $R_2$ is a residue selected from the class consisting of hydrogen and an ω-oxyalkyl residue with 2–5 carbon atoms; and
    (c) substantially from 0.1 to 0.5 mol per isocyanate group of a compound having the formula $$R_3X$$

wherein $R_3$ is an aliphatic hydrocarbon residue with more than 12 carbon atoms; and X is a residue selected from the class consisting of hydroxyl, -carboxyl, -carboxylic acid amide, and amino groups, with 0.5% to 10% by weight of the aqueous emulsions of a substance selected from the class consisting of reaction products of compounds containing epoxy-groups with amines selected from the class consisting of di- and polyamines of aliphatic, cycloaliphatic and heterocyclic series, and polyvinyl alcohol.

2. The process of producing aqueous emulsions of compounds containing perfluoralkylgroups, which comprises emulsifying organic solutions of reaction products of
    (a) one mole of a polyisocyanate selected from the class consisting of aromatic, alicylic and aliphatic polyisocyanates with at least two isocyanate groups,
    (b) substantially from 0.3 to 0.6 mol per isocyanate group of a compound having the formula $$R_fSO_2NR_1R_2$$

wherein $R_f$ is a perfluoralkyl residue with at least four carbon atoms; $R_1$ is a residue selected from the class consisting of hydrogen and an aliphatic residue with at most 6 carbon atoms; and $R_2$ is a residue selected from the class consisting of hydrogen and an ω-oxyalkyl residue with 2–5 carbon atoms; and
    (c) substantially from 0.1 to 0.5 mol per isocyanate group of a compound having the formula $$R_3X$$

wherein $R_3$ is an aliphatic hydrocarbon residue with more than 12 carbon atoms; and X is a residue selected from the class consisting of hydroxyl, -carboxyl, -carboxylic acid amide, and aminogroups, with 0.5% to 10% by weight of the aqueous emulsion of a substance selected from the class consisting of aqueous reaction products of compounds selected from the class consisting of aliphatic and aromatic compounds containing epoxygroups with amines selected from the class consisting of di- and polyamines of aliphatic, cycloaliphatic and heterocyclic series.

3. The process in accordance with claim 2, wherein the aliphatic hydrocarbon residue is branched.

4. The process in accordance with claim 2, wherein the reaction products are used in form of aqueous solutions.

5. The process in accordance with claim 2, wherein the reaction products are used in form of aqueous dispersions.

6. The process in accordance with claim 2, wherein the reaction products are neutralized.

7. The process in accordance with claim 2, wherein the reaction products are acidified.

8. The process in accordance with claim 2, comprising emulsifying with condensation products of reaction products of compounds containing epoxygroups with di-polyamines with low aliphatic aldehydes.

9. The process in accordance with claim 8, wherein the aldehyde is a monoaldehyde.

10. The process in accordance with claim 8, wherein the aldehyde is a dialdehyde.

11. The process in accordance with claim 8, wherein the aldehyde is formaldehyde.

12. The process of producing aqueous emulsions of compounds containing perfluoralkylgroups, which comprises emulsifying organic solutions of reaction products of
    (a) one mol of a polyisocyanate selected from the class of aromatic, alicyclic and aliphatic polyisocyanates with at least two isocyanate groups,
    (b) substantially from 0.3 to 0.6 mol per isocyanate group of a compound having the formula $$R_fSO_2NR_1R_2$$

wherein $R_f$ is a perfluoralkyl residue with at least four carbon atoms; $R_1$ is a residue selected from the class consisting of hydrogen and an aliphatic residue with at most 6 carbon atoms; and $R_2$ is a residue selected from the class consisting of hydrogen and an ω-oxyalkyl residue with 2–5 carbon atoms; and
    (c) substantially from 0.1 to 0.5 mol per isocyanate group of a compound having the formula $$R_3X$$

wherein $R_3$ is an aliphatic hydrocarbon residue with more than 12 carbon atoms; and X is a residue selected from the class consisting of hydroxyl, -carboxyl, -carboxylic acid amide, and aminogroups, with 0.5% to 10% by weight of the aqueous emulsion of an aqueous solution of polvinyl alcohol.

13. The process in accordance with claim 12, wherein the polyvinyl alcohol is partly acetylized.

14. The process in accordance with claim 12, wherein the polyvinyl alcohol is party acetalized.

15. The process in accordance with claim 12, wherein the aliphatic hydrocarbon residue is branched.

16. An aqueous emulsion of a compound containing perfluoralkylgroups, resulting from the emulsification in water of organic solutions of reaction products of
    (a) one mol of a polyisocyanate selected from the class consisting of aromatic, alicyclic and aliphatic polyisocyanates with at least two isocyanate groups;

(b) substantially from 0.3 to 0.6 mol per isocyanate group of a compound having the formula $$R_fSO_2NR_1R_2$$

wherein $R_f$ is a perfluoralkyl residue with at least four carbon atoms; $R_1$ is a residue selected from the class consisting of hydrogen and an aliphatic residue with at most 6 carbon atoms; and $R_2$ is a residue selected from the class consisting of hydrogen and an ω-oxyalkyl residue with 2–5 carbon atoms; and (c) substantially from 0.1 to 0.5 mol per isocyanate group of a compound having the formula $$R_3X$$

wherein $R_3$ is an aliphatic hydrocarbon residue with more than 12 carbon atoms; and X is a residue selected from the class consisting of hydroxyl, -carboxyl, -carboxylic acid amide, and aminogroups, with 0.5% to 10% by weight of the aqueous emulsion of a substance selected from the class consisting of reaction products of compounds selected from the class consisting of aliphatic and aromatic compounds containing epoxy groups with amines selected from the class consisting of di- and polyamines of aliphatic, cycloaliphatic and heterocyclic series.

17. An aqueous emulsion of a compound containing perfluoralkylgroups, resulting from the emulsification of organic solutions of reaction products of (a) one mol of a polyisocyanate selected from the class consisting of aromatic, alicyclic and aliphatic polyisocyanates with at least two isocyanate groups, (b) substantially from 0.3 to 0.6 mol per isocyanate group of a compound having the formula $$R_fSO_2NR_1R_2$$

wherein $R_f$ is a perfluoralkyl residue with at least four carbon atoms; $R_1$ is a residue selected from the class consisting of hydrogen and an aliphatic residue with at most 6 carbon atoms; and $R_2$ is a residue selected from the class consisting of hydrogen and an ω-oxyalkyl residue with 2–5 carbon atoms; and (c) substantially from 0.1 to 0.5 mol per isocyanate group of a compound having the formula $$R_3X$$

wherein $R_3$ is an aliphatic hydrocarbon residue with more than 12 carbon atoms; and X is a residue selected from the class consisting of hydroxyl, -carboxyl, -carboxylic acid amide, and aminogroups, with 0.5% to 10% by weight of the aqueous emulsion of an aqueous solution of polyvinyl alcohol.

References Cited

UNITED STATES PATENTS

| | | | |
|---|---|---|---|
| 2,772,248 | 11/1956 | Lieberman et al. | 260—29.2 |
| 2,872,428 | 2/1959 | Schroeder | 260—29.2 |
| 2,965,517 | 12/1960 | Albrecht et al. | 260—29.2 |
| 3,255,131 | 6/1966 | Albrecht et al. | 260—29.2 |
| 3,321,445 | 5/1967 | Lazerte et al. | 260—77.5 |

MURRAY TILLMAN, *Primary Examiner.*

J. C. BLEUTGE, *Assistant Examiner.*